United States Patent
Fleury et al.

(10) Patent No.: US 8,529,972 B2
(45) Date of Patent: Sep. 10, 2013

(54) PROCESS TO EXTRACT DRINKING WATER FROM A PLANT

(75) Inventors: Elodie Fleury, Montréal (CA); Mathieu Fleury, Montréal (CA)

(73) Assignee: Eau Matelo Inc., Montreal (CA)

( * ) Notice: Subject to any disclaimer, the term of this patent is extended or adjusted under 35 U.S.C. 154(b) by 271 days.

(21) Appl. No.: 12/872,103

(22) Filed: Aug. 31, 2010

(65) Prior Publication Data

US 2011/0052759 A1    Mar. 3, 2011

Related U.S. Application Data

(60) Provisional application No. 61/238,820, filed on Sep. 1, 2009.

(51) Int. Cl.
    *A23L 2/38*    (2006.01)
(52) U.S. Cl.
    USPC ............................................ 426/66; 426/489
(58) Field of Classification Search
    USPC .................................................. 426/66, 489
    See application file for complete search history.

(56) References Cited

U.S. PATENT DOCUMENTS

| | | | |
|---|---|---|---|
| 3,428,535 A | * | 2/1969 | Putnam ...................... 210/748.2 |
| 5,424,089 A | | 6/1995 | Munch et al. |
| 5,785,504 A | * | 7/1998 | Cote ............................. 417/313 |

FOREIGN PATENT DOCUMENTS

| | | |
|---|---|---|
| CA | 1305475 | 7/1992 |
| CA | 2219968 | 5/1998 |
| CA | 2567559 | 8/2007 |
| JP | 401016896 | * 1/1989 |
| JP | 401300880 | * 12/1989 |

* cited by examiner

*Primary Examiner* — Anthony Weier
(74) *Attorney, Agent, or Firm* — Benoî Côté

(57) ABSTRACT

There is provided a process to extract drinking water from a plant, which includes the steps of: a) filtrating collected plant sap to separate plant water content from concentrated plant extract; and b) disinfecting the separated plant water content to remove or inactivate microorganism to obtain plant drinking water. and the process may further include step c) bottling the plant drinking water. There is also provided plant drinking water prepared according to the process and a liquid beverage containing plant drinking water and nutriments and/or dietary minerals extracted from plants and optionally any flavoring ingredients.

7 Claims, 1 Drawing Sheet

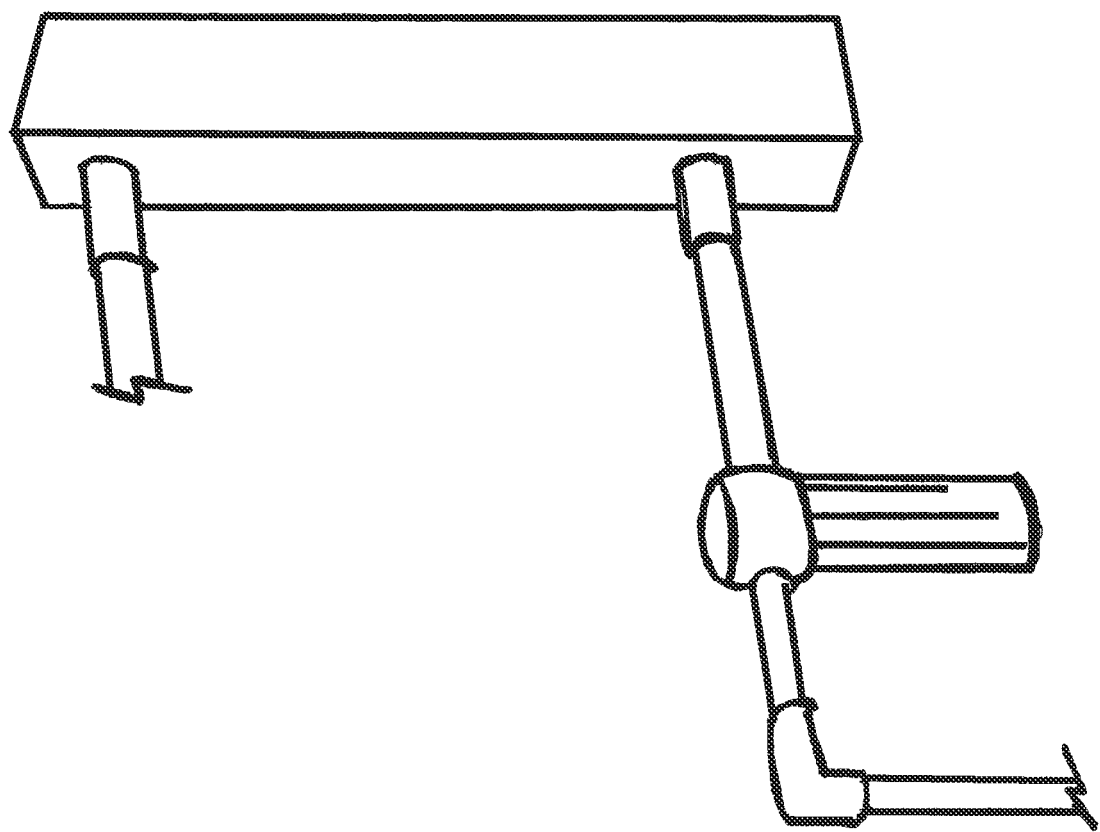

PROCESS TO EXTRACT DRINKING WATER FROM A PLANT

CROSS-REFERENCE TO RELATED APPLICATIONS

This application claims priority under 35USC§119(e) of U.S. provisional patent application 61/238,820, filed on Sep. 1, 2009, the specification of which is hereby incorporated by reference.

BACKGROUND (a) Field

The subject matter disclosed generally relates to a process to extract drinking water from a plant. There is also provided plant drinking water prepared according to the process and beverages, and more particularly to a beverage containing plant drinking water and nutriments and dietary minerals extracted from plant and/or flavoring ingredients.

(b) Related Prior Art

Maple sap is a naturally occurring, unprocessed crystal-clear liquid, having the consistency and clarity of water, which derives from the sugar maple tree. It is generally available from the sugar maple tree during the late winter and early spring. Maple sap has a sugar content ranging from approximately 2 to 5° Brix (° Bx), the majority of the sugar content being sucrose and glucose. The remainder of the maple sap content is naturally occurring water and very small amounts of organic acids, a portion of which is responsible for the maple flavor, and some vitamins and minerals. It is not to be confused with "maple syrup" which is the viscous liquid obtained by concentration and heat treatment of maple sap.

U.S. Pat. No. 5,424,089 to Munch et al. describes carbonated maple sap and method of making the same. However, the beverage produced is prepared from complete sap water and will therefore not be filtered, disinfected or otherwise transformed into drinking water. This patent also describes that the water content that is naturally present in maple sap during the production of maple syrup may be removed and sold as non-carbonated water. This product however is produced from the older boiling process that was formerly used in the production of maple syrup. The water distilled off the sap was condensed and sold. Lastly, this patent also describes that a product may be produced from the water removed from maple sap by reverse osmosis. However, the product described requires a process where the water is strictly filtered and then carbonated before is it sold.

SUMMARY

In a first embodiment there is disclosed a process to extract drinking water from a plant, which comprises the steps of:

a) filtrating plant sap to separate plant water content from concentrated plant extract;

b) disinfecting the separated plant water content to remove or inactivate microorganisms.

The filtration in step a) may be chosen from reverse osmosis, nanofiltration, ultrafiltration and, microfiltration, and any combination thereof.

The plant may be chosen from maple, birch, pine, sugar cane, or any other sap producing plant.

The disinfecting in step b) is chosen from flash pasteurization, filtration, boiling, ultraviolet light, ozonation, any other gas treatment, and any combination thereof.

The microorganisms include, without limitation, a bacteria, a protozoa and a fungi. The bacteria may be a coliform bacteria, such as *E. coli*.

The process to extract drinking water from a plant, may further comprise a step c):

c) bottling the plant drinking water of step b).

In a second embodiment there is disclosed a plant drinking water obtained by the above process, and wherein the so-prepared plant drinking water substantially comprises $H_2O$ and meets high standards of purity comparable to other bottled drinking water while distinguishing itself by its provenance.

In a third embodiment there is disclosed a liquid beverage containing plant drinking water in combination with nutriments and/or dietary minerals extracted from plant.

The liquid beverage may further contain a flavoring ingredient. The flavoring ingredient may be maple sap, concentrated maple sap, maple sugar, orange flavoring, apple flavoring, grapefruit flavoring, pineapple flavoring, strawberry flavoring, raspberry flavoring, cranberry flavoring, lime flavoring, lemon flavoring, grape flavoring, peach flavoring, any other fruit flavoring, vanilla flavoring, chocolate flavoring, caramel flavoring, or any combination thereof.

A preferred plant drinking water or beverage may be obtained from maple sap.

The following terms are defined below.

The term "plant drinking water" is intended to mean drinking water obtained by filtration (such as reverse osmosis, nanofiltration, ultrafiltration, microfiltration or otherwise) of sap of plants, bushes or trees, such as maple tree, birch tree, or sugar cane among others, and by disinfection (such as flash pasteurization, filtration, boiling, ultraviolet light, ozonation, any other gas treatment, and any combination thereof). The plant drinking water mostly consists of $H_2O$ and is free from any potential contaminants, and hence is proper for human consumption.

The term "nutriment" and/or "dietary minerals" is intended to mean the chemical elements required by living organisms, other than the four elements carbon, hydrogen, nitrogen, and oxygen present in common organic molecules. The term "mineral" is archaic, since the intent of the definition is to describe chemical elements, not chemical compounds or actual minerals. Examples include calcium, magnesium, potassium, sodium, zinc, phosphorus, iron, selenium, molybdenum and iodine. Preferred nutriments and dietary minerals include riboflavin, calcium, magnesium, manganese and zinc, all naturally present in maple sap or other plant.

The term "flavoring ingredient" is intended to mean an amount of an ingredient that is added so as to provide an agreeable taste to a product.

The term "maple sugar" is intended to mean sugar from a source of maple sugar such as maple syrup, hard or powdered maple sugar, maple sap, concentrated maple sap and the like.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

FIG. 1 illustrates a typical UV light installation with a small canister sediment filter (bottom) ahead of the UV light unit.

DETAILED DESCRIPTION OF THE PREFERRED EMBODIMENTS

In a first embodiment there is disclosed a process to extract drinking water from a plant, which comprises the steps of:
 a) filtrating plant sap to separate plant water content from concentrated plant extract;
 b) disinfecting the separated plant drinking water to remove or inactivate microorganism.

In another embodiment there is disclosed a plant drinking water obtained by the above process, and wherein the so-prepared plant drinking water is essentially pure and substantially comprises $H_2O$.

In another embodiment there is disclosed a liquid beverage containing:
 plant drinking water obtained by the above-process; and
 nutriments and/or dietary minerals extracted from plants.

In another embodiment there is disclosed a beverage containing plant drinking water and a flavoring ingredient.

In another embodiment there is disclosed a beverage containing plant drinking water with nutriments and/or dietary minerals extracted from plants and a flavoring ingredient.

ALTERNATIVE EMBODIMENTS

Maple sap, among other plant sap, is obtained from the sugar maple tree in the form of a clear, transparent liquid that mainly comprises naturally occurring water and from about 2 to 5° Brix sugar content. Naturally occurring maple sap derived from a maple tree can be used to extract plant drinking water. The plant drinking water may be used to provide a refreshing, thirst quenching product, in the form of a beverage for human consumption.

In the first step of the process, the plant water is extracted from a plant sap using any of the numerous filtration techniques where the plant water content is separated from the concentrated plant extract (containing numerous molecules including, without limitation, sugars, proteins and natural flavouring compounds among others).

In the second step of the process, the plant water content is disinfected to remove, kill or inactivate any microorganisms contained therein. Microorganisms include, without limitation, a bacteria, a protozoa, a fungi.

Most bacteria in the coliform group do not cause disease, but the greater their number the greater the likelihood that disease-causing bacteria may be present. Since coliform bacteria usually persist in water longer than most disease-causing organisms, the absence of coliform bacteria leads to the assumption that the water is microbiologically safe to drink. Therefore, the drinking water standard requires that no coliform bacteria be present in drinking water. Coliform bacteria includes among others *E. coli* bacteria.

The disinfection process step may be effected using, for example, one or any combination of the following techniques.

Flash Pasteurization

Flash pasteurization is a disinfecting process that consists in maintaining the water at a temperature higher than 75° C. during a period of 45 seconds. Vapour is most commonly used or electric current as heat convector as well as temperature sensors to confirm the temperatures.

Ultraviolet Light

Ultraviolet (UV) light is a good option for disinfection treatment since it does not add any chemical to the water. The UV light unit consists of a UV light bulb encased by a quartz glass sleeve (FIG. 1). Water is irradiated with UV light as it flows over the glass sleeve. The untreated water entering the unit must be completely clear and free from any suspended sediment or turbidity to allow all of the bacteria to be irradiated by the light. A sediment filter is often installed ahead of the UV unit to remove any sediment or organic matter before it enters the unit. The quartz glass sleeve must also be kept free of any film. Overnight cleaning solutions can be used to keep the glass sleeve clean, or optional wipers can be purchased with the unit to manually clean the glass. Water with a high hardness (calcium and magnesium) may also coat the sleeve with scale (a whitish deposit of hardness), which may require routine cleaning or addition of a water softener. This system only kills bacteria inside the unit and does not provide any residual disinfectant for bacteria that may survive or be introduced into the plumbing after the UV light unit. Maintenance requirements are minimal for UV units but the light bulb will slowly lose intensity over time and will require replacement about once a year. Some units come equipped with a UV light intensity sensor that can detect when the bulb is not emitting sufficient UV light.

Boiling

Boiling water for about one minute effectively kills bacteria. This method is frequently used to disinfect water during emergencies or while camping.

Ozonation

In recent years, ozonation has received more attention as a method for treating water quality problems including bacterial contamination. Like chlorine, ozone is a strong oxidant that kills bacteria, but it is a much more unstable gas that must be generated on site using electricity. Once the ozone is produced, it is injected into the water where it kills the bacteria.

Beverages Prepared from Plant Drinking Water

Also Maple sap is exceptionally stimulating in that the naturally occurring sugar content and other nutriments and dietary minerals (such as manganese, riboflavin, zinc, potassium, magnesium and calcium) naturally present, together with its distinct maple flavor, provides the basis for the refreshing and thirst quenching aspects of the beverage.

There is described a novel beverage which surprisingly and advantageously captures the refreshing and thirst quenching aspects of beverages made from drinking water extracted from maple sap by combining it with other nutriments and dietary minerals extracted from (i.e. maple) sap. The beverage retains these basic properties while displaying reduced amounts of sugar and minerals, thereby providing a low caloric beverage that is yet a well balanced and refreshing drink.

The above-described plant drinking water or beverage is non-toxic and can therefore be used by humans and animals. The fluid composition may be used in the prevention of, or delay the onset of hyperthermia caused by increase physical exertion or activity, or of exposure to high temperature environments.

The beverage of the present invention may be prepared synthetically from the individual components described above. It may however also be prepared from natural sources of maple sap or maple sap products. Interestingly, use of a natural source of maple sap in the preparation of the beverage of the present invention may contribute to the presence of beneficial microorganisms supplied by the maple to improve its organoleptic properties.

The beverage of the present invention may furthermore be supplemented with a flavoring ingredient in order to improve its taste. The flavoring ingredient may be maple sap, concentrated maple sap or maple sugar. Also, fruit flavoring such as orange, apple, grapefruit, pineapple, strawberry, raspberry, cranberry, lime, lemon, grape, peach, or other flavoring such as vanilla, chocolate, and caramel may be used. These ingredients will be usually added in a flavoring amount to the beverage, which is normally less than 10% by weight of the final volume of the beverage of the present invention. The flavoring ingredient may however be added to the beverage in an amount of 1% or more, preferably from 1% to 10%, and more preferably from 1% to 5%.

The remainder of the beverage is made up of pure drinkable water obtained by filtration using reverse osmosis, nanofiltration, ultrafiltration, microfiltration or otherwise of sap of plants, bushes or trees, such as maple tree, birch tree or sugar cane among others, and disinfection by flash pasteurization, boiling, ultraviolet light, ozonation, any other gas treatment, and any combination thereof.

The embodiments and examples presented herein are illustrative of the general nature of the subject matter claimed and are not limiting. It will be understood by those skilled in the art how these embodiments can be readily modified and/or adapted for various applications and in various ways without departing from the spirit and scope of the subject matter disclosed claimed. The claims hereof are to be understood to include without limitation all alternative embodiments and equivalents of the subject matter hereof. Phrases, words and terms employed herein are illustrative and are not limiting. Where permissible by law, all references cited herein are incorporated by reference in their entirety. It will be appreciated that any aspects of the different embodiments disclosed herein may be combined in a range of possible alternative embodiments, and alternative combinations of features, all of which varied combinations of features are to be understood to form a part of the subject matter claimed.

The invention claimed is:

1. A process to extract drinking water from a plant, which comprises the steps of:
   a) filtrating by reverse osmosis a collected plant sap to separate non-drinkable plant water content from concentrated plant extract;
   b) further filtrating said non-drinkable plant water content by a nanofiltration, an ultrafiltration, a microfiltration or any combination thereof; and
   c) disinfecting the filtrated non-drinkable plant water content of step b to remove or inactivate microorganism and produce said drinking water wherein disinfecting is by flash pasteurization, ultraviolet light, ozonation, or any combination thereof, and
   wherein said drinking water comprises a naturally occurring dietary mineral from plant origin chosen from potassium, calcium, magnesium, manganese, zinc, and combinations thereof.

2. The process of claim 1 wherein said plant is chosen from maple, birch, sugar cane, and other sap producing plant.

3. The process of claim 1 wherein said microorganism is chosen from a bacteria, a protozoa and a fungi.

4. The process of claim 3 wherein said bacteria is a coliform bacteria.

5. The process of claim 4 wherein said coliform bacteria is *E. coli*.

6. The process of claim 1, which further comprises step c)
   c) bottling the plant drinking water of step b).

7. The process of claim 1, wherein disinfecting is by ultraviolet light followed by ozonation.

* * * * *